United States Patent
Watanabe et al.

(10) Patent No.: US 11,986,773 B2
(45) Date of Patent: May 21, 2024

(54) MEMBRANE DEFECT INSPECTION METHOD AND MEMBRANE DEFECT INSPECTION DEVICE

(71) Applicant: KUBOTA CORPORATION, Osaka (JP)

(72) Inventors: Keishi Watanabe, Amagasaki (JP); Shintaro Nishimoto, Amagasaki (JP); Tetsuya Uenaka, Amagasaki (JP); Fang Zhao, Amagasaki (JP); Akira Matsunaga, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 488 days.

(21) Appl. No.: 17/296,367

(22) PCT Filed: Dec. 3, 2019

(86) PCT No.: PCT/JP2019/047119
§ 371 (c)(1),
(2) Date: May 24, 2021

(87) PCT Pub. No.: WO2020/121880
PCT Pub. Date: Jun. 18, 2020

(65) Prior Publication Data
US 2022/0023802 A1 Jan. 27, 2022

(30) Foreign Application Priority Data
Dec. 12, 2018 (JP) .................. 2018-232095

(51) Int. Cl.
*B01D 65/10* (2006.01)
*G01M 3/24* (2006.01)

(52) U.S. Cl.
CPC ............. *B01D 65/104* (2013.01); *G01M 3/24* (2013.01); *B01D 65/102* (2013.01);
(Continued)

(58) Field of Classification Search
CPC ........ G01M 3/243; G01M 3/24; G01M 3/085; B01D 2321/18; B01D 2313/90;
(Continued)

(56) References Cited

U.S. PATENT DOCUMENTS

2003/0159977 A1* 8/2003 Tanny ..................... A61L 2/022
210/194

FOREIGN PATENT DOCUMENTS

CN 201832565 U * 5/2011
CN 201832565 U 5/2011
(Continued)

OTHER PUBLICATIONS

Translate_CN108686512.pdf (Year: 2018).*
(Continued)

*Primary Examiner* — Peter J Macchiarolo
*Assistant Examiner* — Monica S Young
(74) *Attorney, Agent, or Firm* — Oliff PLC (57) ABSTRACT

A membrane defect inspection method that can detect damage in a filtrate membrane and can detect presence or absence of damage or a seal defect in a membrane module; and the method is for a membrane module set including multiple membrane modules connected under gas detection piping communicating with primary spaces of the multiple membrane modules where raw water is supplied or secondary spaces in multiple membrane modules where treated water is extracted after the raw water is filtrated by membranes. The method includes a gas injection process where gas is injected into spaces opposite the primary or secondary spaces communicating with gas detection piping in the multiple membrane modules while the gas detection piping is filled with water, and a vibration detection process where a vibration sensor is brought into contact with a protrusion
(Continued)

protruding outward from the gas detection piping to detect vibration of the gas detection piping.

11 Claims, 4 Drawing Sheets

(52) U.S. Cl.
CPC ...... *B01D 2313/60* (2022.08); *B01D 2313/70* (2022.08); *B01D 2313/903* (2022.08); *G01M 3/243* (2013.01)

(58) Field of Classification Search
CPC ............ B01D 65/102; B01D 2313/903; B01D 2313/60; B01D 2313/70; B01D 65/104
USPC ............................................................ 73/49
See application file for complete search history.

(56) References Cited

FOREIGN PATENT DOCUMENTS

| | | | | |
|---|---|---|---|---|
| CN | 108686512 A | * | 10/2018 | ............. B01D 61/00 |
| JP | H08-010590 A | | 1/1996 | |
| JP | H11-311596 A | | 11/1999 | |
| JP | 2000-342937 A | | 12/2000 | |
| JP | 2001-062263 A | | 3/2001 | |
| JP | 2001-269551 A | | 10/2001 | |
| JP | 2004-329980 A | | 11/2004 | |
| JP | 2004329980 A | * | 11/2004 | |
| JP | 2005-185944 A | | 7/2005 | |
| JP | 2005185944 A | * | 7/2005 | |
| JP | 2005-296908 A | | 10/2005 | |
| JP | 2005296908 A | * | 10/2005 | |
| JP | 2006-218372 A | | 8/2006 | |
| JP | 2007-005739 A | | 1/2007 | |
| JP | 2007-240373 A | | 9/2007 | |
| JP | 2007240373 A | * | 9/2007 | |
| JP | 2012-148218 A | | 8/2012 | |
| KR | 10-2015-0138940 A | | 12/2015 | |
| WO | 99/016538 A1 | | 4/1999 | |
| WO | WO-9916538 A1 | * | 4/1999 | ......... B01D 46/0086 |

OTHER PUBLICATIONS

Translate_JP2005296908.pdf (Year: 2005).*
Jul. 7, 2022 extended Search Report issued in European Patent Application No. 19895933.0.
Oct. 10, 2022 Office Action issued in Chinese Patent Application No. 201980071417.8.
Mar. 15, 2023 Office Action issued in Chinese Patent Application No. 201980071417.8.
Jun. 28, 2023 Office Action issued in European Patent Application No. 19895933.0.
Mar. 5, 2019 Office Action issued in Japanese Patent Application No. 2018-232095.
Jan. 7, 2020 Search Report issued in International Patent Application No. PCT/JP2019/047119.

* cited by examiner

MEMBRANE DEFECT INSPECTION METHOD AND MEMBRANE DEFECT INSPECTION DEVICE

FIELD OF THE INVENTION

The present invention relates to a membrane defect inspection method for a membrane separation apparatus including a plurality of membrane module sets including a plurality of membrane modules connected in parallel under gas detection piping communicating with primary spaces to which raw water is supplied or secondary spaces to which treated water is extracted after the raw water is filtrated by membranes.

DESCRIPTION OF THE RELATED ART

Patent document 1 proposes a damage detection method for a permeable membrane module in a water purifying apparatus. The apparatus includes a casing divided into a raw water chamber, a circulating water chamber communicating with the raw water chamber, and a treated water chamber, and many hollow fiber membranes configured to make the treated water chamber communicate with the circulating water chamber. The apparatus discharges treated water led from the circulating water chamber to the hollow fiber membranes and the treated water chamber. The method includes blowing pressurized gas to outsides of the hollow fiber membranes while only the treated water chamber contains the treated water and the raw water chamber and the circulating water chamber are empty, and detecting bubbles generated on a treated water chamber side so as to detect damage in the hollow fiber membranes.

Patent document 2 proposes a membrane damage detection apparatus for a water treatment filtration system. In the system, raw water is supplied to membrane modules, and treated water purified by the membrane modules is distributed. The apparatus includes a pressurized gas supply means configured to supply pressurized gas at a predetermined pressure to a primary side or a secondary side of the membrane modules, a vibration detection sensor attached to an upper portion of each of the membrane modules to detect vibration caused by a bubble flow leaking out from a damaged part in a membrane and rising in the water, and a vibration analysis processing device configured to individually select a vibration signal detected by each vibration sensor and analyze the vibration signal to detect membrane damage in the membrane modules.

Patent document 3 proposes a membrane damage detection method for a hollow fiber membrane. There is a flow channel where raw liquid is supplied from an outside or an inside of the hollow fiber membrane and filtrate water is extracted from the other side. In the flow channel, part of a pipe where the filtrate water flows or stagnates is made of a transparent pipe. The method includes supplying air to the flow channel, where the raw liquid is supplied from the outside or the inside of the hollow fiber membrane and the filtrate water is extracted from the other side, so as to detect membrane damage in the hollow fiber membrane by passage of bubbles of the air through the transparent pipe.

PRIOR ART DOCUMENT

Patent Documents

[Patent document 1] Japanese Unexamined Patent Application Publication No. 2001-269551
[Patent document 2] Japanese Unexamined Patent Application Publication No. 2007-240373
[Patent document 3] Japanese Unexamined Patent Application Publication No. 1999-311596

SUMMARY OF INVENTION

Problems to be Solved by the Invention

The damage detection method described in Patent document 1 requires using an ultrasonic flowmeter to detect the bubbles, which imposes an installation restriction that the ultrasonic flowmeter needs to be installed to a straight pipe having a predetermined length for establishing an appropriate detection environment, and thus the ultrasonic flowmeter cannot be installed to all types of water purifying apparatus.

The membrane damage detection apparatus described in Patent document 2 has problems. The apparatus requires many vibration detection sensors since the vibration detection sensor is attached to each of the membrane modules. A firm structure of the membrane module having pressure resistance weakens vibration signals to be detected by the vibration detection sensor, and thus detection accuracy is degraded due to noise of external vibration or the like.

The membrane damage detection method described in Patent document 3 requires visual inspection of whether the bubbles of the air pass through the transparent pipe, and thus automatic detection is difficult.

In view of the problems described above, an object of the present invention is to provide a membrane defect inspection method and a membrane defect inspection device that can automate detection of damage in a filtrate membrane and can properly detect presence or absence of damage or a seal defect in a membrane module.

Means for Solving the Problems

In order to achieve the object described above, a first characteristic configuration of a membrane defect inspection method for a membrane module set according to the present invention is that the method is for the membrane module set including a plurality of membrane modules connected in parallel under gas detection piping communicating with primary spaces in the plurality of membrane modules to which raw water is supplied or secondary spaces in the plurality of membrane modules to which treated water is extracted after the raw water is filtrated by membranes. The method includes a gas injection process where gas is injected into spaces opposite to the primary spaces or the secondary spaces communicating with the gas detection piping in the plurality of membrane modules while the gas detection piping is filled with water, and a vibration detection process where a vibration sensor is brought into contact with a protrusion, which protrudes outward in a radial direction from an outer surface of the gas detection piping, to detect vibration of the gas detection piping.

In the gas injection process performed while the gas detection piping is filled with water, when any of filtrate membranes accommodated in the membrane modules has a defect part, gas leaks out from the defect part to flow into the gas detection piping. When bubbles, made out of the gas, flow into the water filled in the gas detection piping, the bubbles rise in the treated water piping and hit against an inner wall to cause vibration to the gas detection piping. The protrusion included in the gas detection piping serves as a vibration detection piece that transmits the vibration of the gas detection piping. When the vibration sensor is brought into contact with the protrusion, the vibration caused to the gas detection piping is detected, and thus it can be determined based on the vibration that any of the filtrate membranes accommodated in the membrane modules connected to the gas detection piping has the defect part.

A second characteristic configuration of the method is that the method is for the membrane module set including the plurality of membrane modules connected in parallel under the gas detection piping communicating with the primary spaces in the plurality of membrane modules to which the raw water is supplied or the secondary spaces in the plurality of membrane modules to which the treated water is extracted after the raw water is filtrated by the membranes. The method includes the gas injection process where the gas is injected into the spaces opposite to the primary spaces or the secondary spaces communicating with the gas detection piping in the plurality of membrane modules while the gas detection piping is filled with water, and the vibration detection process where the vibration sensor is brought into contact with a protrusion, which extends in an axial direction of the gas detection piping from an end portion of the gas detection piping, to detect the vibration of the gas detection piping.

When the protrusion with which the vibration sensor is brought into contact extends in the axial direction of the gas detection piping from the end portion of the gas detection piping, the vibration caused to the gas detection piping when the bubbles rise in the gas detection piping and hit against the inner wall is securely transmitted to the vibration sensor. In addition, since the protrusion extends in the axial direction of the gas detection piping, flexibility for installing the vibration sensor can be secured without imposing any special restrictions on a connection structure between the gas detection piping and the plurality of membrane modules.

A third characteristic configuration of the method is that, in addition to the second characteristic configuration described above, the protrusion may be a short pipe extending in the axial direction of the gas detection piping from the end portion of the gas detection piping.

When the protrusion is formed of the short pipe extending in the axial direction of the gas detection piping, the vibration sensor can be attached to any one of inner and outer circumferences of the short pipe. Specifically, when the vibration sensor is attached to the inner circumference of the short pipe, the short pipe itself functions as a protection member for the vibration sensor.

A fourth characteristic configuration of the method is that, in addition to any of the first to third characteristic configurations described above, the gas detection piping is made of resin.

When the gas detection piping is made of resin, the vibration caused to the gas detection piping when the bubbles rise in the gas detection piping and hit against the inner wall is propagated to the protrusion without being attenuated largely, and thus sufficient detection accuracy can be attained.

A first characteristic configuration of a membrane defect inspection method for a membrane separation apparatus according to the present invention is that the method is for the membrane separation apparatus including a plurality of membrane module sets including the plurality of membrane modules connected in parallel under the gas detection piping. The method includes the gas injection process to be performed while the water is filled in gas detection large piping communicating with the gas detection piping and collecting the gas emitted to the gas detection piping in the whole membrane separation apparatus, and a gas accumulation detection process where an accumulation of the gas in the gas detection large piping is detected. When the accumulation of the gas is detected in the gas accumulation detection process, the membrane defect inspection method for the membrane module set including any of the first to fourth characteristic configurations described above is performed.

When the accumulation of the gas is detected in the membrane separation apparatus including the plurality of membrane module sets, it can be determined that any of the membrane modules has damage or a seal defect. Then, performing the membrane defect inspection method for the membrane module set allows efficient detection of the damage or the seal defect in a filtrate membrane.

A second characteristic feature of the method is that, in addition to the first characteristic configuration described above, at least part of the gas detection large piping may be transparent, and a gas-liquid interface observed at the transparent portion of the gas detection large piping may be detected by an image analysis to detect the accumulation of the gas in the gas accumulation detection process.

When at least part of the gas detection large piping is transparent, a state of this part can be visually confirmed and the accumulation of the gas can be visually detected. In addition, the accumulation of the gas can be automatically determined by taking an image of the transparent portion of the gas detection large piping and performing the image analysis of the image.

A characteristic configuration of a membrane defect inspection device for the membrane module set according to the present invention is that the device is configured to implement the membrane defect inspection method for the membrane module set including any of the first to fourth characteristic configurations described above. The device includes the membrane module set including the plurality of membrane modules connected in parallel under the gas detection piping communicating with the primary spaces in the plurality of membrane modules to which the raw water is supplied or the secondary spaces in the plurality of membrane modules to which the treated water is extracted after the raw water is filtrated by the membranes, the protrusion included in the gas detection piping, the vibration sensor attached to the protrusion, and a signal processing section configured to detect inflow of the gas into the gas detection piping due to the gas injection process based on a vibration signal detected by the vibration sensor.

Effects of Invention

As described above, the present invention can provide a membrane defect inspection method and a membrane defect inspection device that can automate detection of damage or a seal defect in a filtrate membrane and can properly detect presence or absence of damage or a seal defect in a membrane module.

DESCRIPTION OF THE PREFERRED EMBODIMENTS

A membrane defect inspection method and a membrane defect inspection device according to the present invention are described below.

[Configurations of Membrane Module Set and Membrane Separation Apparatus]

Figure 1A:
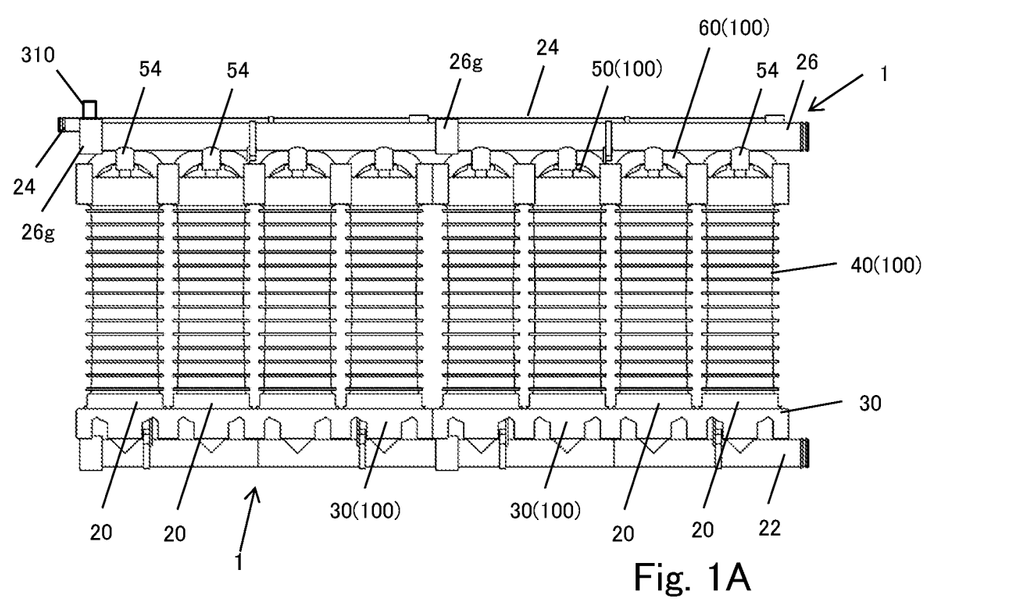
FIG. 1A is a front view of a membrane module set.
Figure 1B:
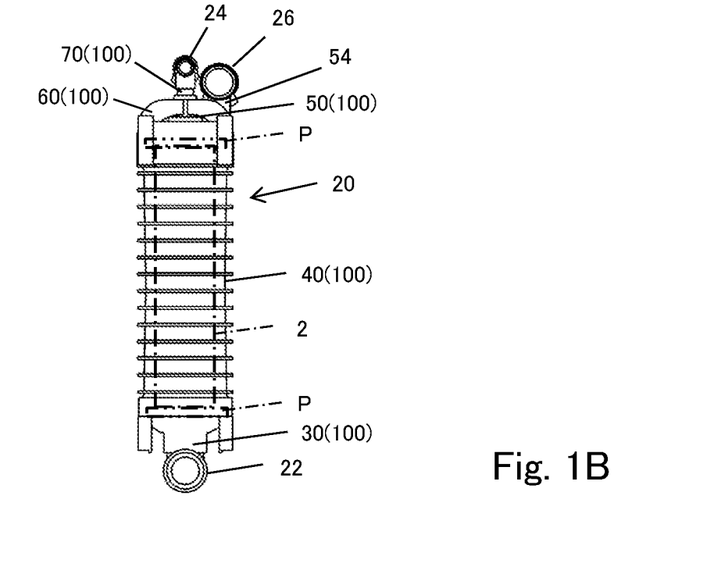
FIG. 1B is a left side view of the membrane module set.

FIG. 1A and FIG. 1B illustrate a membrane module set 1 to which the membrane defect inspection method according to the present invention is applied. The membrane module set 1 includes eight membrane modules 20, a raw water header pipe 22 serving as raw water supply piping configured to supply raw water to each membrane module 20, a cleaning header pipe 24 serving as cleaning air piping configured to supply air, water, or chemical liquid for cleaning to each membrane module 20, and a filtrate water header pipe 26 serving as treated water piping configured to collect filtrate water from each membrane module 20.

Each membrane module 20 includes a membrane casing 100 and a membrane element 2 (indicated by a dashed line in FIG. 1B) accommodated in the membrane casing 100. The membrane casing 100 includes a base 30, a casing body 40, an upper lid 50, a support section 60 supported by the casing body 40, a holding section 70 holding the support section 60 and the upper lid 50 such that relative positions of the support section 60 and the upper lid 50 are adjustable along an axial direction of the casing body 40, or the like. The membrane element 2 is accommodated in the casing body 40 with its top and bottom pressed via seal members P between the base 30 and the upper lid 50.

The raw water supplied from the raw water header pipe 22 is filtrated by the membrane element 2, and the filtrate water flows through a gap between an inner wall of the casing body 40 and the membrane element 2 to a filtrate water outflow pipe 54 formed to the upper lid 50 to be collected into the filtrate water header pipe 26.

When the membrane element 2 is clogged up or soiled, cleaning water is supplied from the filtrate water header pipe 26 to clean the membrane element 2, and the cleaning water is discharged from the raw water header pipe 22. Then, cleaning air or the like is supplied from the cleaning header pipe 24 for flushing. As for the base 30, casing body 40, upper lid 50, support section 60, holding section 70, or the like, any material such as metal or resin may be used as long as it can endure pressure during a filtration process or a cleaning process. As for the piping such as the filtrate water header pipe 26, resin is used, such as an ABS resin or a polyvinyl chloride resin suitable for workability and inspection of membrane damage described later.

As for the membrane element 2, any filtrate membrane may be used, such as a microfiltration membrane, an ultrafiltration membrane, or a nanofiltration membrane, if it blocks particles or macromolecules in a predetermined size in accordance with a use. The filtrate membrane may include an organic membrane such as a hollow fiber membrane made of cellulose acetate or polyimide, or a porous inorganic membrane made of a ceramic material.

When the raw water is injected from the raw water header pipe 22, a filtration process makes progress to remove foreign substances by a filtration membrane layer on an inner wall of a fluid flow hole formed in the membrane element 2, and the filtrate water flowing out from a surface of the membrane element 2 is led to the filtrate water outflow pipe 54 through a space formed between a circumferential surface of the membrane element 2 and an inner wall surface of the casing body 40 to be collected into the filtrate water header pipe 26.

The plurality of membrane modules 20, namely, eight membrane modules 20 in the present embodiment, are connected in parallel under a straight pipe portion of the filtrate water header pipe 26 serving as the treated water piping extending in the horizontal direction, so as to constitute the membrane module set 1.

Figure 2A:
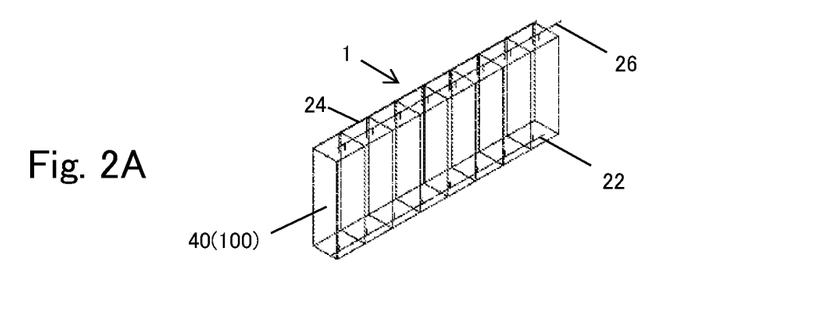
FIG. 2A is a schematic view of the membrane module set and FIG. 2B is a schematic view of a membrane separation apparatus including a plurality of membrane module sets.

FIG. 2A is a simplified schematic view of the membrane module set 1 described above, and FIG. 2B is a schematic view of a membrane separation apparatus 200 including a plurality of membrane module sets 1 including the plurality of membrane modules 20 connected in parallel to the filtrate water header pipe 26.

Figure 2B:
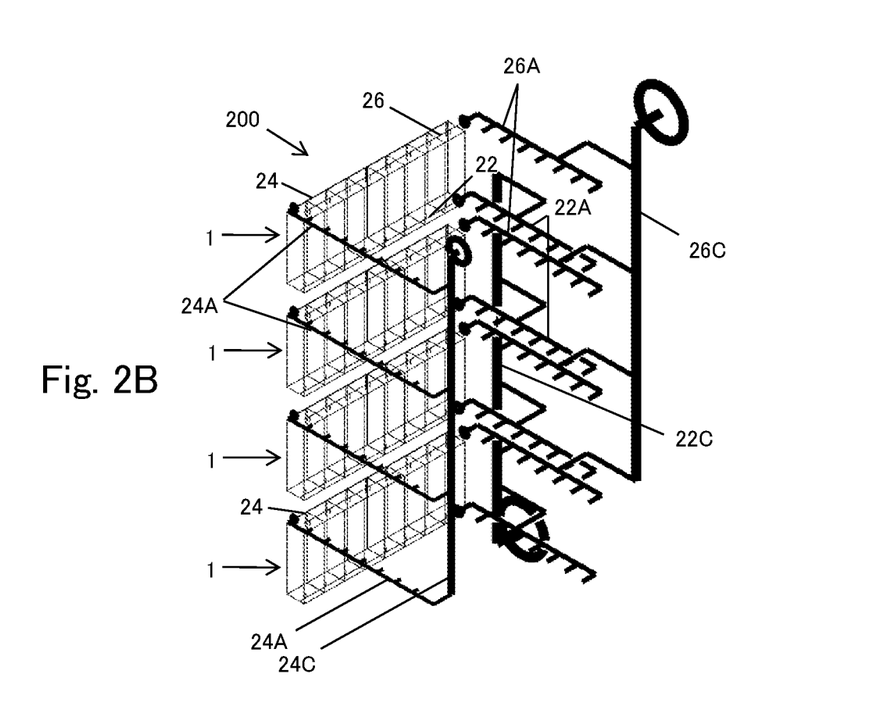

A frame having a vertically long rectangular parallelepiped contour has four shelves in a vertical direction, and each shelf includes eight membrane module sets 1. The raw water header pipe 22, cleaning header pipe 24, and filtrate water header pipe 26 in each membrane module set 1 are respectively connected to raw water large piping 22C, cleaning large piping 24C, and filtrate water large piping 26C serving as treated water large piping via relay piping 22A, 24A, and 26A.

[Membrane Defect Inspection Method and Membrane Defect Inspection Device]

When any of the membrane modules 20 included in the plurality of membrane module sets 1 constituting the membrane separation apparatus 200 has membrane damage or a seal defect, turbidity is mixed in the treated water, which disables appropriate filtration processing.

Even in such a case, with the membrane defect inspection method according to the present invention, presence or absence of the membrane module 20 having the membrane damage or the seal defect can be detected, and the membrane module 20 in an abnormal state can be replaced immediately. The filtrate water header pipe 26 functions as gas detection piping and the filtrate water large piping 26C functions as gas detection large piping.

Figure 3A:
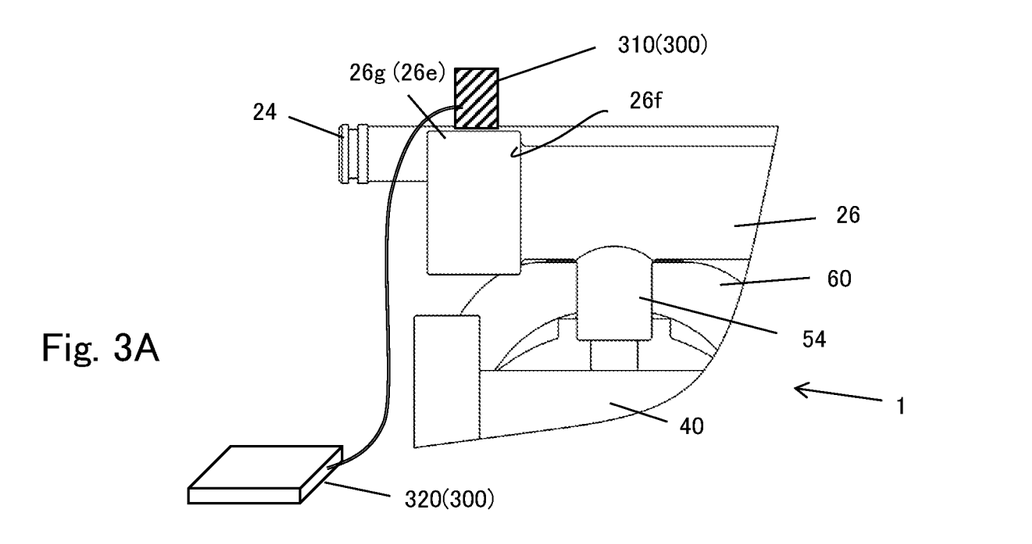
FIG. 3A and FIG. 3B are explanatory views of a vibration sensor disposed to be in contact with a protrusion of treated water piping.
Figure 3B:
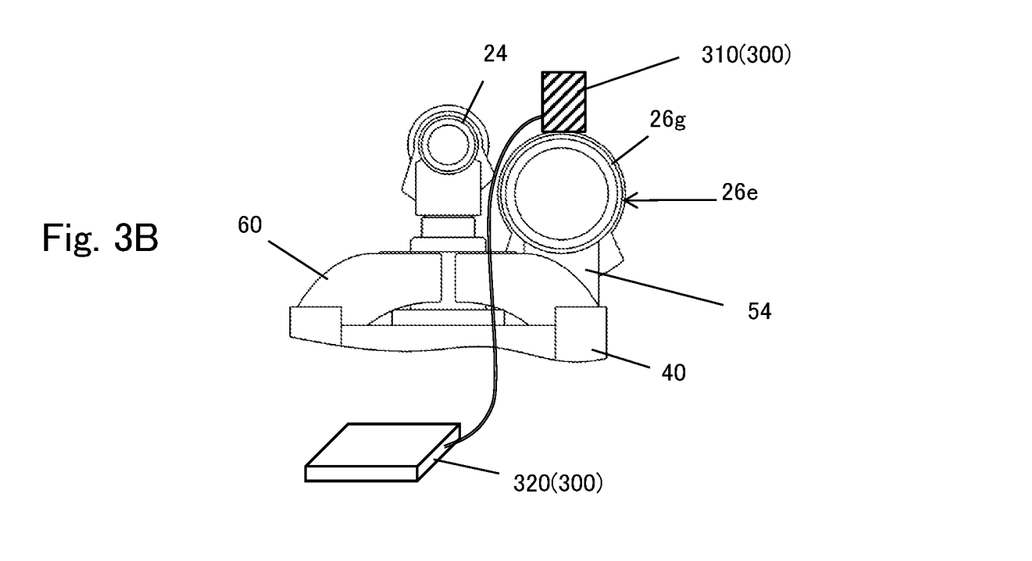

As shown in FIG. 3, the filtrate water header pipe 26 in each membrane module set 1 has a flange 26g for pipe connection, and the flange 26g is formed at a pipe end portion 26e opposite to a side connected to the filtrate water large piping 26C so as to extend from a pipe end face 26f to have a slightly larger diameter. The flange 26g serves as a short pipe extending in an axial direction of the treated water piping 26.

A membrane defect inspection device 300 includes a vibration sensor 310 and a signal processing section 320. The vibration sensor 310 is disposed to be in contact with an outer surface of the flange 26g and connected with the signal processing section 320 by a signal wire.

The vibration sensor 310 is brought into contact with the outer surface of the flange 26g while the filtrate water header pipe 26 is filled with water and air is injected into the membrane elements 2 from the raw water header pipe 22 communicating with primary spaces in the membrane modules 20 to which the raw water is supplied. When any of the filtrate membranes accommodated in the membrane modules 20 has a defect part, gas leaks out from the defect part into the secondary space in the membrane module 20 to which the treated water is extracted after filtration by the filtrate membrane, and flows into the filtrate water header pipe 26. When bubbles, made out of the gas, flow into the water filled in the filtrate water header pipe 26, the bubbles rise in the filtrate water header pipe 26 and hit against an upper part of an inner wall to cause vibration to the filtrate water header pipe 26.

The flange 26g that is a protrusion included in the filtrate water header pipe 26 serves as a vibration detection piece that transmits the vibration of the filtrate water header pipe 26. When the vibration sensor 310 is brought into contact with the flange 26g, the vibration caused to the filtrate water header pipe 26 is detected, and thus it can be determined based on the vibration that any of the filtrate membranes accommodated in the membrane modules 20 connected to the filtrate water header pipe 26 has the defect part.

Then, a vibration signal detected by the vibration sensor 310 is input to the signal processing section 320 through the signal wire, a period and amplitude of the vibration is calculated after amplification processing, and it is determined whether the vibration is caused by gas leakage. When the vibration is caused by the gas leakage, the vibration is detected at random and distinguished from the vibration caused by a single mechanical impact from outside.

As described above, the filtrate water header pipe 26 serving as the treated water piping is preferably made of resin having excellent vibration transmission characteristics. Accordingly, the filtrate water header pipe 26 includes a pipe member made of resin such as an ABS resin or a polyvinyl chloride resin. As a result, when the vibration sensor 310 is brought into contact with the protrusion protruding outward from the filtrate water header pipe 26, the vibration caused by the gas leakage can be properly detected.

As described above, the protrusion with which the vibration sensor 310 is disposed to be in contact is preferably the short pipe extending from the end portion of the filtrate water header pipe 26 in the axial direction of the filtrate water header pipe 26, however, the protrusion is not necessarily the short pipe, and may be a protruding piece in a plate shape extending from the end portion of the filtrate water header pipe 26 in the axial direction of the filtrate water header pipe 26. Moreover, the protruding piece is not limited to a configuration extending in the axial direction of the filtrate water header pipe 26, and may have any configuration as long as the protruding piece protrudes outward from an outer surface of the filtrate water header pipe 26 and can transmit the vibration of the filtrate water header pipe 26.

The membrane defect inspection device 300 described above is included in each of the membrane module sets 1 constituting the membrane separation apparatus 200, and the signal processing section 320 is remotely controlled, so that presence or absence of abnormality can be automatically detected whenever necessary.

However, when the membrane defect inspection device 300 is included in each of the membrane module sets 1, economic efficiency may be degraded. In view of this, a membrane defect inspection method for the membrane separation apparatus 200 described below may be performed, and when abnormality is detected in any of the membrane module sets 1, the membrane defect inspection method for each membrane module set 1 may be manually performed, so as to improve the economic efficiency.

That is, the membrane defect inspection method for the membrane separation apparatus 200 requires that the treated water large piping 26C to which the treated water obtained in the whole membrane separation apparatus 200 is extracted is at least partly transparent. The method includes a gas injection process where gas is injected from a raw water supply side of the membrane separation apparatus 200, serving as a primary space, namely, the raw water large piping 22C, while the treated water large piping 26C is filled with water, and a gas accumulation detection process where a gas accumulation in a transparent portion of the treated water large piping 26C serving as a secondary space is detected. When the gas accumulation is detected in the gas accumulation detection process, the membrane defect inspection method for the membrane module set 1 described above is performed.

Figure 4A:
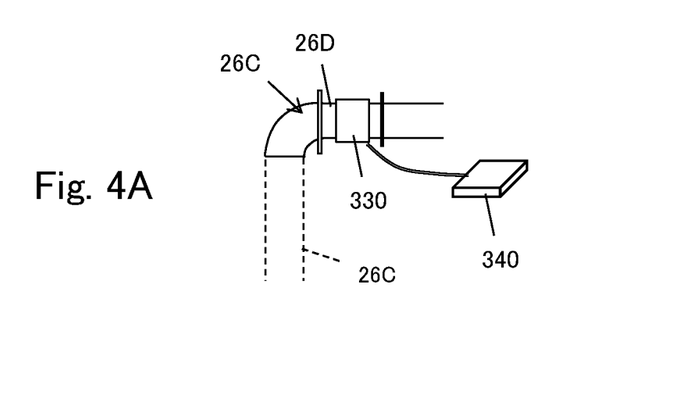
FIG. 4A illustrates a defect inspection method for the membrane separation apparatus and is an explanatory view of an inspection device attached to filtrate water large piping in the membrane separation apparatus.

As shown in FIG. 4A, it is preferable that part of horizontal piping flange-connected with a bent pipe at an upper end portion of the treated water large piping 26C be formed of a transparent resin pipe 26D, and an imaging device 330 be disposed to take an image of an inside of the pipe through the transparent resin pipe 26D in a horizontal manner.

Figure 4B:
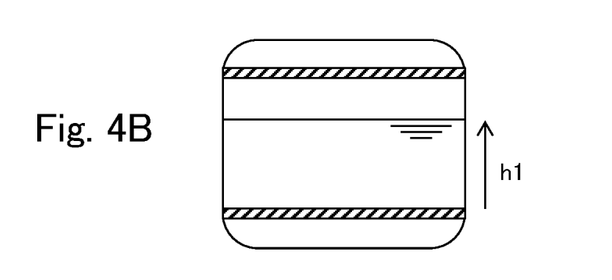
FIG. 4B illustrates the defect inspection method for the membrane separation apparatus and is an explanatory view of an inspection image in a normal state.
Figure 4C:
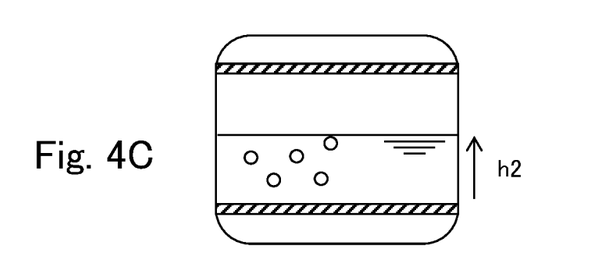
FIG. 4C illustrates the defect inspection method for the membrane separation apparatus and is an explanatory view of an inspection image in an abnormal state.

When any of the membrane modules 20 has membrane damage or a seal defect, leaking bubbles flow into the transparent resin pipe 26D and rise so as to shift a water surface downward. An image processing device 340 analyzes the image including a gas-liquid interface taken by the imaging device 330, so that when a decline of the water surface is detected, it can be determined that any of the membrane modules 20 is out of order.

A computer device with image analysis software installed can be suitably used as the image processing device 340, and the gas-liquid interface can be extracted by performing edge extraction processing to the taken image, for example. The analysis may be performed by the image processing device 340 remotely installed by wirelessly transmitting the image taken by the imaging device 330.

Alternatively, a shift of the gas-liquid interface may be observed by direct visual checking of the transparent resin pipe 26D without using the imaging device 330 and the image processing device 340.

In the membrane module set 1 according to the embodiment described above, the filtrate water header pipe 26 is disposed above the membrane modules 20 and the filtrate water header pipe 26 is used as the gas detection piping. However, in a membrane module set 1 including the raw water header pipe 22 disposed above the membrane modules 20, gas may be injected into the secondary spaces in the membrane modules 20 to use the raw water header pipe 22 as the gas detection piping and the raw water large piping 22C as the gas detection large piping. In this case, the gas may be injected from a filtrate water extraction side of the membrane modules 20, and the protrusion may be disposed at an end portion of the raw water supply piping such that the vibration sensor 310 is disposed to be in contact with the protrusion.

Furthermore, in the membrane module set 1 according to the above-described embodiment, the cleaning air piping may be used as the gas detection piping and the cleaning large piping 24C may be used as the gas detection large piping, or the gas detection piping and the gas detection large piping exclusively used for membrane defect inspection may be separately disposed.

That is, the membrane defect inspection method according to the present invention is the method for the membrane module set 1 including the plurality of membrane modules 20 connected in parallel under the gas detection piping communicating with the primary spaces in the plurality of membrane modules 20 to which the raw water is supplied or the secondary spaces in the plurality of membrane modules 20 to which the treated water is extracted after the raw water is filtrated by the membranes. The method includes the gas injection process where the gas is injected into spaces opposite to the primary spaces or the secondary spaces communicating with the gas detection piping in the plurality of membrane modules 20 while the gas detection piping is filled with water, and a vibration detection process where the vibration sensor 310 is brought into contact with the protrusion, which protrudes outward from the gas detection piping, to detect the vibration caused by the gas flowing into the gas detection piping through the defect part in the filtrate membrane in the gas injection process.

Basic configurations of the membrane defect inspection method and the membrane defect inspection device according to the present invention have been described above with reference to the drawings, however, specific inspection procedures and device configurations of the membrane defect inspection method and the membrane defect inspection device are not limited to the mode described in the above-described embodiment, and may be selected and implemented as appropriate as long as the operations and effects of the present invention are obtained.

REFERENCE SIGNS LIST

1 Membrane Module Set
2 Membrane Element
20 Membrane Module
22 Raw Water Header Pipe (Raw Water Supply Piping)
24 Cleaning Header Pipe (Cleaning Air Piping)
26 (Treated Water Piping) Filtrate Water Header Pipe
26C (Treated Water Large Piping) Filtrate Water Large Piping
40 Casing (Body)
50 Casing (Upper Lid)
54 Filtrate Water Outflow Pipe
60 Support Section
300 Membrane Defect Inspection Device
310 Vibration Sensor
320 Signal Processing Section

The invention claimed is:

1. A membrane defect inspection method for a membrane module set comprising a plurality of membrane modules connected in parallel under a straight pipe portion of gas detection piping extending in a horizontal direction, the straight pipe portion communicating with raw water inlets in the plurality of membrane modules or treated water outlets in the plurality of membrane modules, the method comprising:
    a gas injection process where gas bubbles leaking from a defect part of a membrane of the membrane module set hit against the straight pipe portion of the gas detection piping while the gas detection piping is filled with water; and
    a vibration detection process where a vibration sensor is brought into contact with a surface of a protrusion, the surface not being in contact with the water, to detect vibration of the gas detection piping through the protrusion, the vibration being caused by the hitting of the gas bubbles against the straight pipe portion of the gas detection piping, the protrusion protruding outward in a radial direction from an outer surface of the gas detection piping.

2. A membrane defect inspection method for a membrane separation apparatus comprising a plurality of membrane module sets comprising the plurality of membrane modules connected in parallel under the gas detection piping, the method comprising:
    performing the gas injection process while the water is filled in gas detection large piping communicating with the gas detection piping and collecting the gas bubbles in the large piping; and
    a gas accumulation detection process where an accumulation of the gas in the gas detection large piping is detected,
    wherein the membrane defect inspection method for the membrane module set according to claim 1 is performed when the accumulation of the gas is detected in the gas accumulation detection process.

3. The membrane defect inspection method for the membrane separation apparatus according to claim 2,
    wherein at least part of the gas detection large piping is transparent, and
    wherein a gas-liquid interface observed at a transparent portion of the gas detection large piping is detected by an image analysis to detect the accumulation of the gas in the gas accumulation detection process.

4. The membrane defect inspection method for the membrane module set according to claim 1,
    wherein the gas detection piping is made of resin.

5. A membrane defect inspection device for the membrane module set, the device being configured to implement the membrane defect inspection method according to claim 1, the device comprising:
    the membrane module set comprising the plurality of membrane modules connected in parallel under the gas detection piping communicating with the raw water inlets or the treated water outlets in the plurality of membrane modules;
    the protrusion comprised in the gas detection piping;
    the vibration sensor attached to the protrusion; and
    a signal processing section configured to detect inflow of the gas into the gas detection piping due to the gas injection process based on a vibration signal detected by the vibration sensor.

6. A membrane defect inspection method for a membrane module set comprising a plurality of membrane modules connected in parallel under a straight pipe portion of gas detection piping extending in a horizontal direction, the straight pipe portion communicating with raw water inlets in the plurality of membrane modules or treated water outlets in the plurality of membrane modules, the method comprising:
    a gas injection process where gas bubbles leaking from a defect part of a membrane of the membrane module set hit against the straight pipe portion of the gas detection piping while the gas detection piping is filled with water; and
    a vibration detection process where a vibration sensor is brought into contact with a surface of a protrusion, the surface not being in contact with the water, to detect vibration of the gas detection piping through the protrusion, the vibration being caused by the hitting of the gas bubbles against the straight pipe portion of the gas detection piping, the protrusion extending in an axial direction of the gas detection piping from an end portion of the gas detection piping.

7. A membrane defect inspection method for a membrane separation apparatus comprising a plurality of membrane module sets comprising the plurality of membrane modules connected in parallel under the gas detection piping, the method comprising:

performing the gas injection process while the water is filled in gas detection large piping communicating with the gas detection piping and collecting the gas bubbles in the large piping; and a gas accumulation detection process where an accumulation of the gas in the gas detection large piping is detected, wherein the membrane defect inspection method for the membrane module set according to claim 6 is performed when the accumulation of the gas is detected in the gas accumulation detection process.

8. The membrane defect inspection method for the membrane separation apparatus according to claim 7, wherein at least part of the gas detection large piping is transparent, and wherein a gas-liquid interface observed at a transparent portion of the gas detection large piping is detected by an image analysis to detect the accumulation of the gas in the gas accumulation detection process.

9. The membrane defect inspection method for the membrane module set according to claim 6, wherein the protrusion is a short pipe extending in the axial direction of the gas detection piping from the end portion of the gas detection piping.

10. The membrane defect inspection method for the membrane module set according to claim 9, wherein the gas detection piping is made of resin.

11. The membrane defect inspection method for the membrane module set according to claim 6, wherein the gas detection piping is made of resin.

* * * * *